United States Patent
Kupetz et al.

(10) Patent No.: US 6,244,492 B1
(45) Date of Patent: Jun. 12, 2001

(54) COVER FOR A COMPONENT SURFACE

(75) Inventors: Bern Kupetz, Langenhagen; Anton Meitinger, Sielenbach, both of (DE)

(73) Assignee: MTU Motoren-und Turbinen-Union München GmbH, Munich (DE)

( * ) Notice: Subject to any disclaimer, the term of this patent is extended or adjusted under 35 U.S.C. 154(b) by 0 days.

(21) Appl. No.: 09/549,050

(22) Filed: Apr. 13, 2000

(30) Foreign Application Priority Data

Apr. 27, 1999 (DE) ................................................ 199 19 054

(51) Int. Cl.[7] ........................... B23K 20/12; B23K 37/00; B23K 5/22
(52) U.S. Cl. ................................................ 228/2.1; 228/212
(58) Field of Search ................................... 228/2.1, 212

(56) References Cited

U.S. PATENT DOCUMENTS

| | | | |
|---|---|---|---|
| 4,162,388 | * 7/1979 | Heider | 219/96 |
| 4,362,261 | * 12/1982 | Cook, Jr. | 228/2 |
| 5,816,859 | * 10/1998 | Dubin et al. | 439/638 |
| 5,865,364 | * 2/1999 | Trask et al. | 228/212 |

FOREIGN PATENT DOCUMENTS

11297199 * 10/1999 (JP) ................................... 228/2.1

* cited by examiner

Primary Examiner—Clifford C. Shaw
Assistant Examiner—L. Edmondson
(74) Attorney, Agent, or Firm—Schiff Hardin & Waite

(57) ABSTRACT

A cover for a component surface to provide protection against hot metal splashes, during processing of the component itself or a component in its vicinity. The material for the cover is an elastic rubber plastic of adequate temperature stability which can be fixed to, and removed from, the component by adhesion/sticking. The surface geometry facing the component, of the cover is exactly complementary to the geometry of the component surface. The thickness of the cover is matched to the energy content of the expected metal splashes with the highest energy, and maintains a specified minimum dimension at every position.

10 Claims, 1 Drawing Sheet

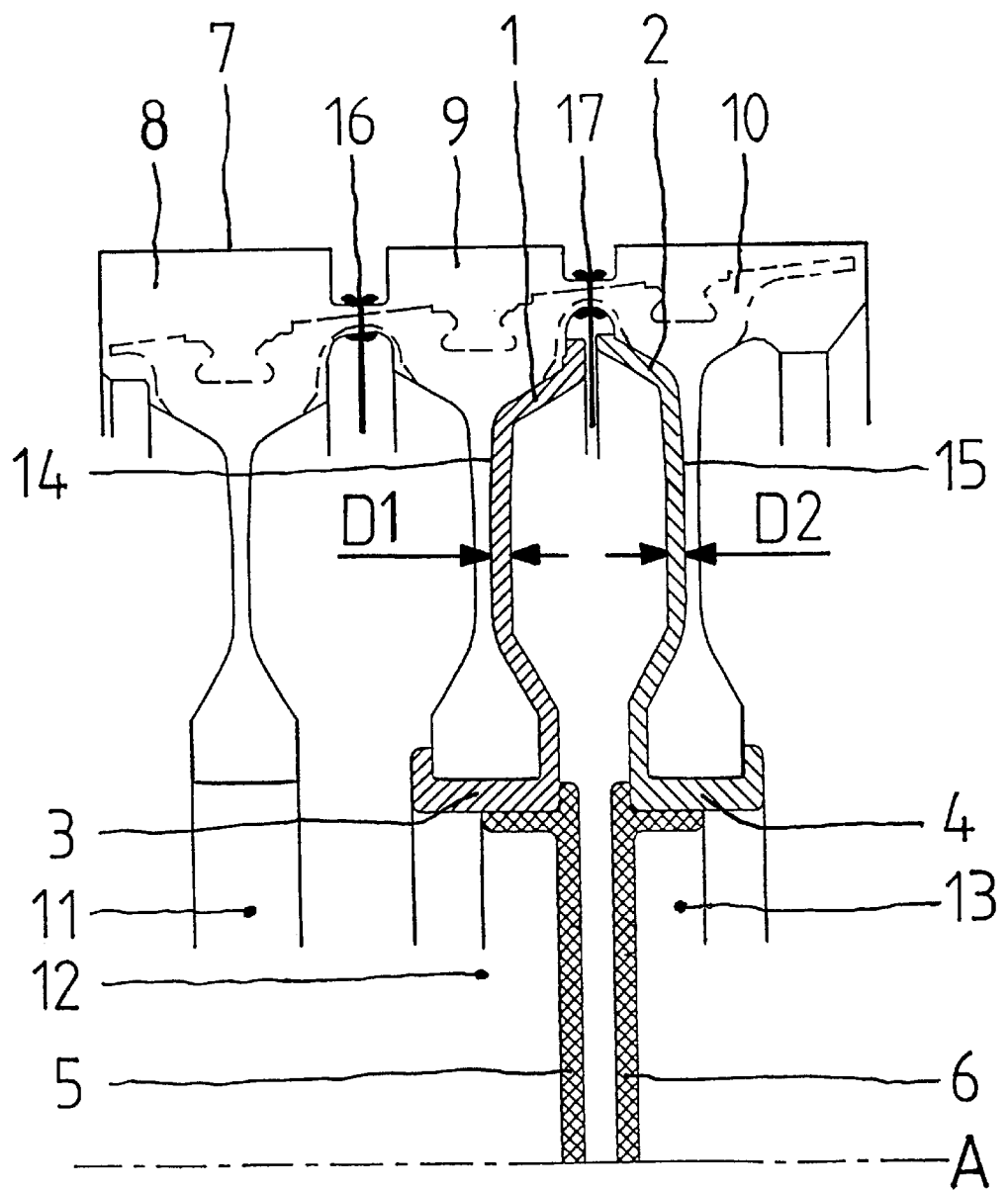

COVER FOR A COMPONENT SURFACE

FIELD OF THE INVENTION

The present invention relates to a cover for a component surface to provide protection against hot metal splashes.

BACKGROUND OF THE INVENTION

Covers for component surfaces, which are primarily used as protection during welding tasks where splashes are generated are well known. Such covers range from provisional solutions in the form of aluminum foil attached with aluminum adhesive tape to more elaborate solutions in the form of complex steel structures which are connected by means of screws to the components to be protected.

It is often the case that the surfaces of components near welding connections are already fine-machined or finished. If welding splashes hit such surfaces, then they can partially melt the component and they remain adhered to it. Removal of such cooled down components can be very labor-intensive, for example requiring removal by turning on the lathe, by milling or by grinding. Often, nicks, margins, bumps etc. remain which at least visually/aesthetically have a negative effect on the component, with the possible metallurgical effects being still more serious. The considerable local heat supply caused by a high-temperature weld splash of sizeable mass can lead to changes in the microstructure which negatively affect strength or fatigue strength, such as e.g. localized grain coarsening, embrittlement, hardening, softening, shrinkage-cavitation forming, cracking etc. By way of crack generation and crack growth, such flaws can eventually lead to failure of the component as a result of deformation or fracture. All kinds of surface coatings can also be locally damaged or destroyed by welding splashes. Therefore in many cases there is a requirement for providing a cover which safely prevents any welding splashes from contacting component surfaces.

Depending on the welding process employed, the energy content of welding splashes differs according to mass, temperature and speed, with rotary friction welding generating particularly harmful splashes as a result of its kinematics and energy density.

However, hot metal splashes occur not only during welding. Uncontrolled release of metal splashes can occur during production wherever a locally molten component material is generated with a high energy supply which is not always precisely controllable or where such splashes in a molten or liquid state can hit the surfaces of components or devices at considerable speed. Autogenous cutting as well as working with high-energy laser sources for the purpose of cutting, drilling and removing, are examples of such problematic process methods. Similarly, in the case of very substantial material removal, rotating grinding wheels or cutting-off wheels can generate critical metal splashes. All this confirms the requirement for protective covers for component surfaces.

SUMMARY OF THE INVENTION

In view of this situation, it is the object of the invention to provide a cover for a component surface as a protection against hot metal splashes, which is simple and economical to produce, reproducible, reliable and unproblematic in use as well as adequately robust and durable.

This object is met by a cover for a component surface that provides protection against hot metal splashes during the processing of the component or a nearby component by local generation of molten material. Such processing may include rotary friction welding. The cover prevents metal contact between the metal splashes and the component as well as critical local heat to the component. The cover comprises an elastic rubber plastic material which can be detachably connected to the component; a surface geometry faces the component and which is complementary to the geometry of the component so that the cover overlies the component; and, the cover has a uniform thickness that is matched to the energy content, including the kinetic energy, of the expected metal splashes to thereby provide adequate protection for the component.

In an embodiment, the cover comprises a silicone rubber that releases no fluid or fluid residue to the component surface.

In an embodiment, the cover is reusable.

In an embodiment, the cover has a thickness that is constant at every point at which the cover overlies the component surface.

In an embodiment, the cover is for use in the production of gas turbine rotors by rotary friction welding by combining disk-like components arranged coaxially one behind the other and which further comprise central apertures. The cover comprises a hub-like region which mateably engages the apertures of the component so as to absorb centrifugal forces.

In an embodiment, the cover comprises a hub-like region which blocks off access to the apertures of the component by means of a dimensionally rigid lid portion.

From the point of view of material, the cover comprises an elastic rubber material of adequate temperature stability which adheres to the component surface. If the adherence of the material of the cover is inadequate (which may apply in particular in the case of dynamic load by centrifugal forces/inertia forces), then in addition a suitable adhesive material may be added. It is important that the cover can be easily removed again from the component, preferably without destroying the cover.

Adhesion is improved or provided in that the surface geometry of the cover facing the component is precisely matched to, or complementary to, the component surface. This presumes that the component surface is also smooth, e.g. following fine-machining.

The puncture strength of the cover is matched by a minimal thickness to the maximum expected energy content of impacting metal splashes, i.e. their kinetic and thermal energy, i.e. it depends on the particular treatment process which generates the splashes. Thus by good matching, cover material can be saved, i.e. the weight and costs of the cover can be reduced.

Other objects and advantages of the invention will become apparent upon reading the following detailed description and appended claims, and upon reference to the accompanying drawing.

BRIEF DESCRIPTION OF THE DRAWING

For a more complete understanding of the present invention, reference should now be made to the embodiment illustrated in greater detail in the accompanying drawing and described below by way of an example of the present invention.

In the drawing:

The FIGURE is a longitudinal sectional view of a gas turbine rotor that comprises three disk-like friction-welded components equipped with two covers that provide protection against metal splashes and that are made in accordance with the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DESCRIPTION OF THE PRESENTLY PREFERRED EMBODIMENTS

The depicted gas turbine rotor 7 shown comprises three disk-like coaxial components 8, 9, 10, arranged axially one behind the other, integrally composed by rotary friction welding. For reasons of symmetry, only the region above its axis A is shown. The gas turbine rotor 7 is in a semifinished state, i.e. It still comprises several overmeasure regions which will be removed later. In places where the final contour significantly differs from the actual contour, the final contour is shown separately by a broken line. This is the case in the region where later the blades will be attached, i.e. in the area of the radially exterior (in the diagram the upper) thickness regions of components 8, 9, 10. The welding zones 16, 17 show the state after joining, with excessive material (flash) that has emerged, being shown in black. During rotary friction welding, within a short time, high kinetic rotation energy is transferred by friction to thermal energy, with the material in the welding zone being converted to a viscous melt state and partially emerging from the welding zone in a bead-like or hook-like shape. This weld process which from a metallurgical point of view is rather like a forging process, involves very substantial transformation/deformation of energy and material. As a rule, high-energy metal splashes are released during this process which impact at considerable speed, i.e. kinetic energy impacts onto component surfaces in the vicinity which can damage such component surfaces.

The FIGURE shows the production situation resulting from the production of the joint connection in the welding zone 17 (between components 9 and 10). The component surfaces 14, 15 which are directly endangered by splashes are covered by covers 1, 2 according to the invention which extend close to the welding zone 17. A certain minimum distance to the hot area ensures that the cover margins do not melt or burn in those parts. The covers 1, 2 are geometrically exactly matched to the component surfaces 14, 15; they stick to said component surfaces by adhesion. Since the puncture strength of the covers 1, 2 should be the same at any position, it makes sense to design them with a thickness D1, D2 (D1=D2=const.) at least approximately constant and the same. Because during rotary friction welding at least one of the covers 1, 2 rotates with the associated component, both covers are specially supported against centrifugal loads. All components 8, 9, 10 comprise central apertures 11, 12, 13 which can be used to advantage for support. To this effect, the covers 1, 2 comprise hub-like regions 3, 4 which reach through the apertures 12, 13 with a positive fit, thus fixing themselves into place on all sides with a hook action. For stiffening, the regions 3, 4 are thicker than the actual splash protection regions. Since it cannot be excluded that metal splashes entering the apertures of regions 3, 4 with ricocheting changes of direction, can reach axially adjacent component zones, the apertures 12, 13 are closed off by dimensionally rigid lids 5, 6 which are pressed or locked into place in the hub-like elastic regions 3, 4 (non-positive or positive locking not shown in detail). For example foamed hard plastic is an economical and light material for the lids 5, 6.

Silicone rubber is the preferred material for the covers 1, 2 because it optimally combines the qualities of permanent elasticity, surface adhesion and temperature stability. Silicone types are selected which do not release any fluid components, e.g. in the form of oils, so as to prevent contamination of the component surfaces, e.g. in view of subsequent crack detection. In cases of extreme load, additional adhesive can be applied which in itself should be able to be removed from the component, leaving as little residue as possible.

It is advantageous if the production of the covers is on a formed part (dummy) which as far as possible geometrically corresponds to the respective component surface. The use of a scrap component without relevant divergence in dimensions in the region of interest, is favorable.

The desired cover thickness is achieved by means of a rear formed part (mask) which is fixed at a specified distance to the dummy. In practice, an excess volume of paste-like silicone material is applied to the dummy, the mask is pressed-on at the opposite side, with excess material emerging at the circumference. In this state the rubber is left to cure; subsequently the excess rim is cut off. For easy lifting, dummy and mask need to be coated with a parting agent, e.g. based on a Teflon.

The elastic rubber characteristics make it possible to realize positive-locking variants with encompassing shapes, with undercut regions etc., which could not be realized with single-part rigid covers. Generally speaking, the elasticity considerably facilitates placement and removal of the covers.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A cover for a component surface to provide protection against hot metal splashes during processing of the component itself or a nearby component by local generation of molten material, in particular during rotary friction welding of gas turbine components, to prevent metal contact between metal splashes and the component, and critical local heat supply to the component, the cover comprising:

an elastic rubber plastic material which can be detachably connected to the component;

the cover further comprising a surface geometry which faces the component which is complementary to the component and which overlies the component; and the cover having a minimum thickness which is matched to the energy content including the kinetic energy, of the expected metal splashes with the highest energy.

2. The cover of claim 1 wherein the material comprises a silicone rubber which releases no fluid residue to the component surface.

3. The cover of claim 1 wherein the cover is a reusable stable integral part.

4. A cover for a component surface to provide protection against hot metal splashes during processing of the component itself or a nearby component by local generation of molten material, in particular during rotary friction welding of gas turbine components, to prevent metal contact between metal splashes and the component, and critical local heat supply to the component, the cover comprising:

an elastic rubber plastic material which can be detachably connected to the component;

the cover further comprising a surface geometry which faces the component which is complementary to the component and which overlies the component; and the cover having a minimum thickness which is matched to the energy content including the kinetic energy, of the expected metal splashes with the highest energy, the thickness of the cover being constant at every position of the component surface to be protected.

5. The cover of claim 1 wherein the cover is for use in the production of gas turbine rotors by rotary friction welding by combining disk-like components arranged coaxially one behind the other, said disk-like components having central apertures, and wherein the cover comprises a hub-like region which overlies the apertures of the component so as to absorb centrifugal forces.

6. The cover of claim 5 wherein the hub-like region blocks off access to the apertures by means of a dimensionally rigid lid.

7. A cover for a component surface to provide protection against hot metal splashes during processing of the component itself or a nearby component by local generation of molten material, in particular during rotary friction welding of gas turbine components, to prevent metal contact between metal splashes and the component, and critical local heat supply to the component, the cover comprising:

a silicone rubber material which can be detachably connected to the component and which releases no fluid residue to the component surface;

the cover further comprising a surface geometry which faces the component which is complementary to the component and which overlies the component; and the cover having a constant minimum thickness which is matched to the energy content including the kinetic energy, of the expected metal splashes with the highest energy, and wherein the cover is for use in the production of gas turbine rotors by rotary friction welding by combining disk-like components arranged coaxially one behind the other, said disk-like components having central apertures, and wherein the cover comprises a hub-like region which overlies the apertures of the component.

8. A cover according to claim 7, which includes rigid lids received in the hub-like regions of the cover to close the apertures.

9. A cover according to claim 7, wherein the surface of the component overlied by the cover is a machined surface.

10. A cover according to claim 1, wherein the surface of the component overlied by the cover is a machined surface.

* * * * *